(12) United States Patent
Dirneder

(10) Patent No.: US 11,143,339 B2
(45) Date of Patent: Oct. 12, 2021

(54) COUPLING FOR FLUID CONDUITS

(71) Applicant: PRAHER PLASTICS CANADA LTD., Barrie (CA)

(72) Inventor: John Dirneder, Barrie (CA)

(73) Assignee: Praher Plastics Canada Ltd., Ontario (CA)

( * ) Notice: Subject to any disclaimer, the term of this patent is extended or adjusted under 35 U.S.C. 154(b) by 113 days.

(21) Appl. No.: 16/680,689

(22) Filed: Nov. 12, 2019

(65) Prior Publication Data

US 2020/0149665 A1   May 14, 2020

Related U.S. Application Data

(60) Provisional application No. 62/760,168, filed on Nov. 13, 2018.

(51) Int. Cl.
| | |
|---|---|
| *F16L 19/025* | (2006.01) |
| *F16L 17/06* | (2006.01) |
| *F16L 19/02* | (2006.01) |
| *F16L 15/00* | (2006.01) |

(52) U.S. Cl.
CPC ......... *F16L 19/0218* (2013.01); *F16L 15/003* (2013.01); *F16L 17/06* (2013.01); *F16L 19/025* (2013.01)

(58) Field of Classification Search
CPC ..... F16L 19/0218; F16L 19/025; F16L 17/06; F16L 15/003

USPC ......................................................... 285/354
See application file for complete search history.

(56) References Cited

U.S. PATENT DOCUMENTS

| | | | | | |
|---|---|---|---|---|---|
| 2,726,104 | A | * | 12/1955 | Boitnott | 285/354 |
| 2,912,262 | A | * | 11/1959 | Franck | 285/354 |
| 5,775,743 | A | * | 7/1998 | Rochelle | F16L 19/0218 |
| | | | | | 285/354 |
| 8,366,155 | B1 | * | 2/2013 | Nolasco | 285/354 |
| 2004/0094959 | A1 | * | 5/2004 | Shemtov | F16L 19/025 |
| | | | | | 285/354 |

FOREIGN PATENT DOCUMENTS

| | | | | | |
|---|---|---|---|---|---|
| DE | | 489883 C | * | 1/1930 | ........ F16L 19/0218 |
| DE | | 4328877 A1 | * | 3/1995 | ........ F16L 19/025 |

\* cited by examiner

*Primary Examiner* — Zachary T Dragicevich
(74) *Attorney, Agent, or Firm* — Hartman Global IP Law; Gary M. Hartman; Domenica N. S. Hartman

(57) ABSTRACT

A coupling including a first member having a first body portion with threads tapered at a less than standard taper rate extending along an exterior surface thereof and a first flange portion extending therefrom. A first recess extends axially into the first flange portion and a first seal is located within the first recess. A body flange portion extends from the first body portion and axially spaced apart therefrom. A second recess extends axially into the first body flange portion and a second sealing ring is located within the second recess. The second seal is identical in size and shape with the first seal and is interchangeable therewith.

19 Claims, 3 Drawing Sheets

COUPLING FOR FLUID CONDUITS

CROSS REFERENCE TO RELATED APPLICATIONS

This application claims the benefit of U.S. Provisional Application No. 62/760,168 filed Nov. 13, 2018. The contents of this prior application are incorporated herein by reference.

FIELD

The present disclosure relates generally to couplings between fluid conduits and more specifically to couplings between two fluid conduits such as pipes for transporting water.

BACKGROUND

In environments wherein fluid conduits are used, it is important to maintain engagements between conduits which prevent the escape of fluids from the conduits. Many types of couplings and fittings have been designed in order to achieve tight engagement between the ends of two fluid conduits, such as pipes made of metal or plastic. Such couplings often include at least two mated parts, male and female, which when connected may form a seal by compressing a sealing element. To further enhance the integrity of the coupling, the mating parts may be cemented together. It is important that the integrity of the sealing element is maintained during assembly of the mating parts with the fluid conduits to be joined in order to prevent leakage of fluid from the piping.

In some fluid conduit coupling assemblies, the male part may have a threaded body portion which is tapered in accordance with National Pipe Thread (NPT) Standards. The tapered thread facilitates the formation of a threaded interference fit with the fluid conduit to which the male part may be coupled for example by torqueing as the flanks of the threads of each fluid conduit sealingly engage or compress against each other. The taper rate for NPT threads is preferably 1 inch of diameter in 16 inches of length, or 62.5 millimeters per meter. In assembly, a technician may couple a fluid conduit with the tapered thread portion and tighten by hand until a loose interference fit engagement occurs between the conduit and the threaded body portion of the male part. In such cases, there may be unoccupied thread remaining on the body portion of the male part. The technician may then unscrew the conduit from the male part and apply a sealant such as Teflon tape to the threads where the interference fit occurred. The technician would then screw the conduit back onto the threaded body portion and tighten by hand until the interference fit engagement occurs over the sealant. The technician may then further tighten the engagement using a tool such as a pipe wrench. Due to the tapering on the threads, further tightening often results in overtightening and cracking of the conduit part being attached to the coupling assembly. This can leave the technician in the field without a suitable replacement for the broken conduit as such parts may have to be ordered from a manufacturer.

Further, in some cases, the design of the coupling does not permit for easy positioning of the sealing element within the coupling. Moreover, assembly may be complex which can result in shifting of the sealing element. Improper positioning of the sealing element may result in a reduction of the serviceable life of the seal and may also cause mechanical damage to the seal at the time of assembly. Further still, the seal may fall out of the coupling during assembly which can result in the accumulation of dirt or debris on the sealing element. Often, this may result in the seal being discarded. This can result in not only loss of materials but also loss of time as it may be difficult to locate a suitable replacement for the discarded sealing element.

Hence, in light of the aforementioned, there is a desire for couplings for fluid conduits wherein the risk of breakage of parts due to overtightening is reduced, where the sealing element can be positioned securely such that the risk of damage to the sealing element is reduced and whereby the sealing element may be readily exchanged with a suitable replacement if damage does happen to occur.

SUMMARY

The present disclosure relates generally to couplings between fluid conduits and more specifically to couplings between two fluid conduits such as pipes for transporting water.

In one aspect, there is provided a coupling including a first tubular member having a first body portion with threads tapered at a less than standard taper rate extending along an exterior surface thereof. A first flange end portion extends radially outwardly from the first body portion. A first recess extends axially into the first flange end portion parallel relative a longitudinal axis of the first tubular member and toward the first body portion. A first sealing ring is located within the first recess. A first body flange portion extends radially outwardly from the first body portion and axially spaced apart from the first flange end portion. A second recess extends axially into the first body flange portion parallel relative the longitudinal axis of the first tubular member and toward the first flange end portion. A second sealing ring is within the second recess. The second sealing ring may be identical in size and shape with the first sealing ring and interchangeable with the first sealing ring. In another aspect, the threads of the first tubular member with the less than standard taper rate sealingly engage with threads of a female conduit when the female conduit is torqued into engagement with the first tubular member, the threads of the female conduit being one of parallel threads and threads having a standard taper rate. The standard taper rate may be a National Pipe Thread standard taper rate. The threads of the first body portion may have a less than standard pitch diameter. The less than standard pitch diameter may be 0.006 to 0.008 inches below a lower pitch diameter tolerance of National Pipe Thread standard pitch diameter. A bore may extend axially through the first tubular member and at least one rib may extend longitudinally at least partially along the bore. In another aspect, a plurality of ribs spaced apart about the bore may extend longitudinally at least partially along the bore. The first tubular member may be formed of a material having a high temperature tolerance.

In another aspect, the coupling may include a second tubular member having a second body portion. A second flange end portion may extend radially outwardly from the second body portion. The coupling further includes a collar axially displaceable along the second body portion and engageable with the first flange end portion to draw the second flange end portion into abutment with the first flange end portion for sandwiching the first sealing ring between the first flange end portion and the second flange end portion within the first recess. The second tubular member may be formed of a material having a high temperature tolerance. The first flange end portion may further include a first abutment surface portion into which the first recess extends. The second flange end portion may further include a second abutment surface portion. The first sealing ring may be compressed within the first recess as the first abutment surface portion and the second abutment surface portion are drawn together.

The collar may have a neck portion for axial displacement along the second body portion and sized for abutment with the second flange end portion and a mouth portion wider than the neck portion and extending from the neck portion and over and beyond the second flange end portion for engagement with the first flange end portion. The second body portion may be smooth at least partially along an exterior thereof and the neck portion is slidable along the second body portion.

An exterior surface portion of the first flange end portion and an interior surface portion of the mouth portion may both be threaded for cooperative threaded engagement therebetween.

In another aspect, there is provided a tubular member including a body portion having threads tapered at a less than standard taper rate extending along an exterior surface thereof. A flange end portion extends radially outwardly from the body portion. A first recess extends axially into the first flange end portion parallel relative a longitudinal axis of the tubular member and toward the body portion. A first sealing ring is within the first recess. A body flange portion extends radially outwardly from the body portion and axially spaced apart from the flange end portion. A second recess extends axially into the body flange portion parallel relative the longitudinal axis of the tubular member and toward the flange end portion. A second sealing ring is within the second recess. The second sealing ring may be identical in size and shape with the first sealing ring and interchangeable with the first sealing ring. In another aspect, the threads of the first tubular member with the less than standard taper rate sealingly engage with threads of a female conduit when the female conduit is torqued into engagement with the first tubular member, the threads of the female conduit being one of parallel threads and threads having a standard taper rate. The standard taper rate may be a National Pipe Thread standard taper rate. The threads of the first body portion may have a less than standard pitch diameter. The less than standard pitch diameter may be 0.006 to 0.008 inches below a lower pitch diameter tolerance of National Pipe Thread standard pitch diameter. A bore may extend axially through the first tubular member and at least one rib may extend longitudinally at least partially along the bore. In another aspect, a plurality of ribs spaced apart about the bore may extend longitudinally at least partially along the bore. The first tubular member may be formed of a material having a high temperature tolerance. The flange end portion may further include an abutment surface portion into which the first recess extends. The first sealing ring may be compressible within the first recess as the abutment surface portion and the second tubular member are drawn together.

The flange end portion may be for engagement with a collar extendable from a second tubular member for drawing a second tubular member into abutment with the flange end portion for sandwiching the first sealing ring between the flange end portion and the second tubular member within the first recess. An exterior surface portion of the flange end portion may be threaded for cooperative threaded engagement with the collar.

The components, advantages and other features of the coupling will become more apparent upon reading of the following non-restrictive description of some optional configurations, given for the purpose of exemplification only, with reference to the accompanying drawings.

DETAILED DESCRIPTION

The present disclosure relates generally to couplings between fluid conduits and more specifically to couplings between two fluid conduits such as pipes for transporting water.

Figure 1:
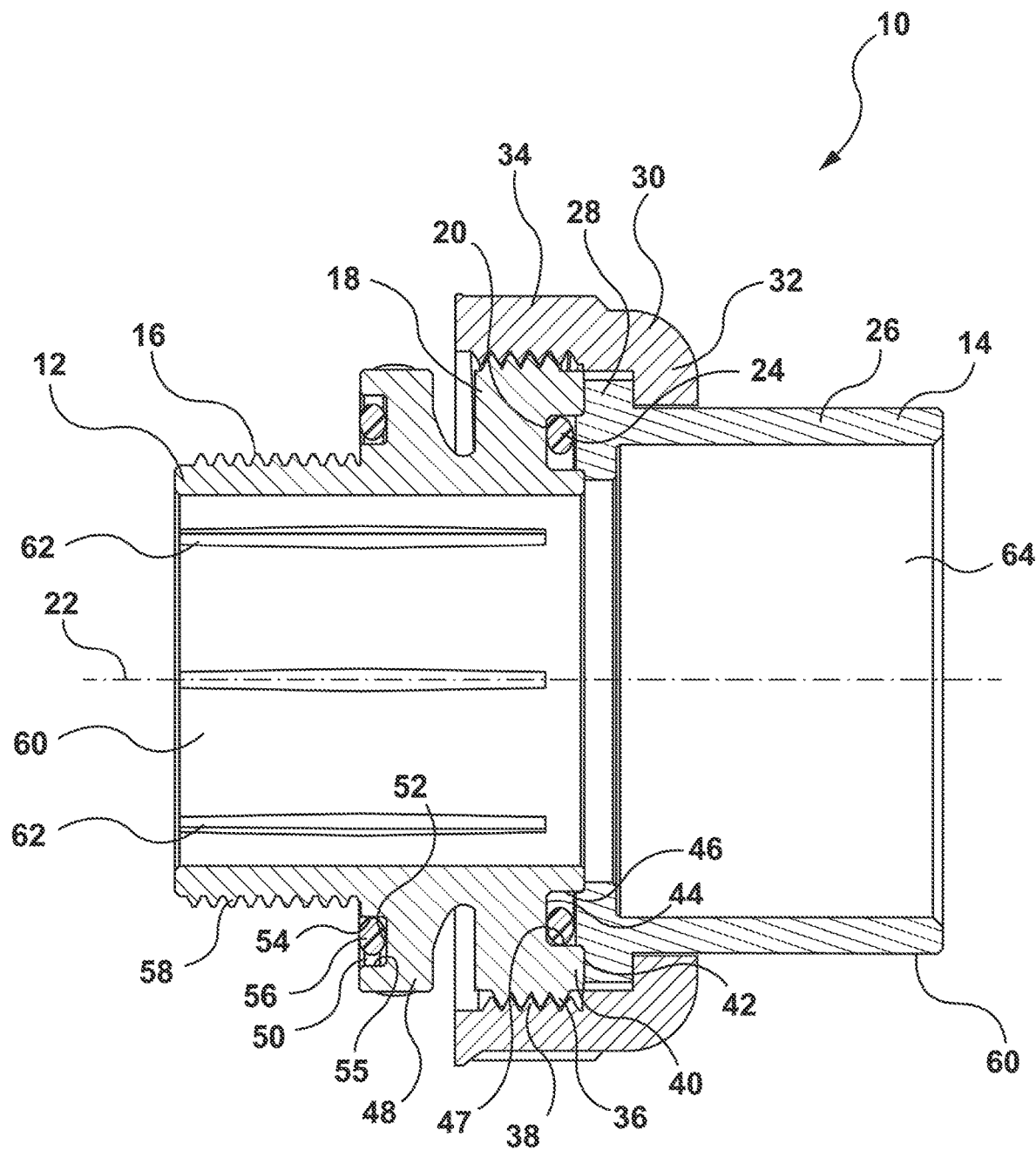
FIG. 1 is a section view of the coupling between the first and second tubular members.
Figure 2:
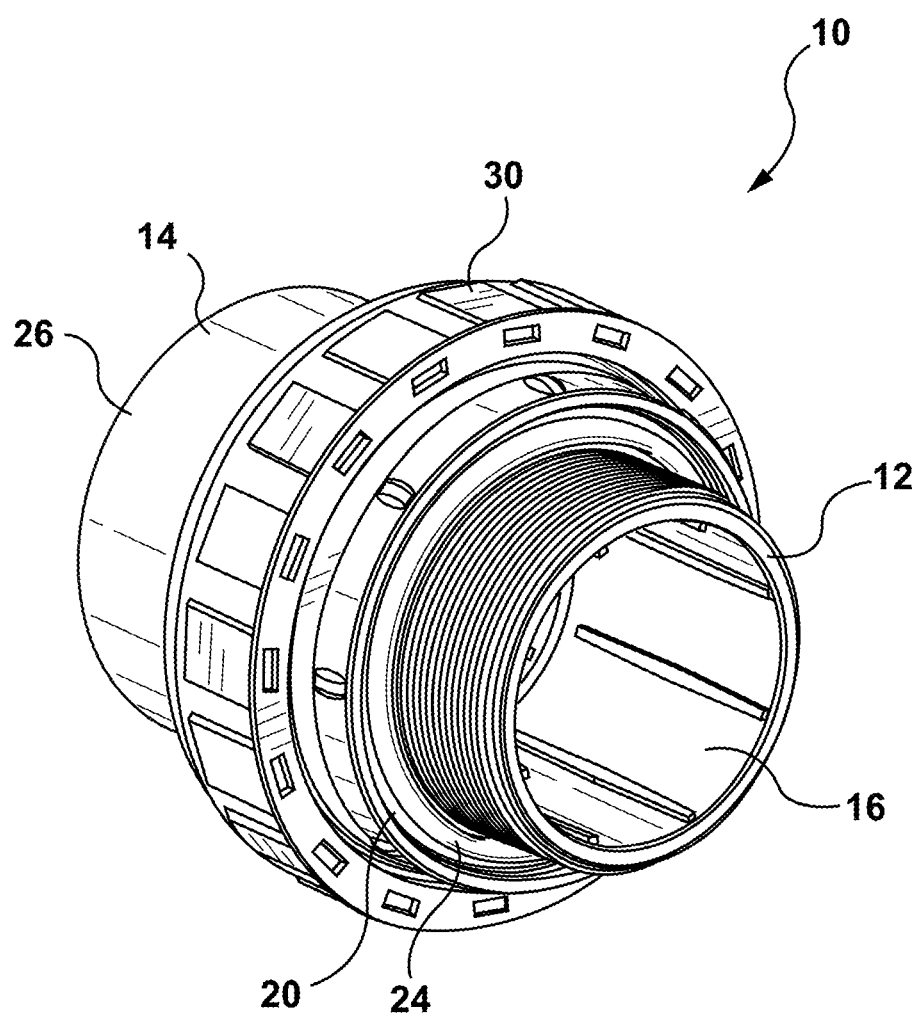
FIG. 2 is a perspective view of first and second tubular members coupled together; and, FIG. 3 is an exploded view of the first and second tubular members.
Figure 3:
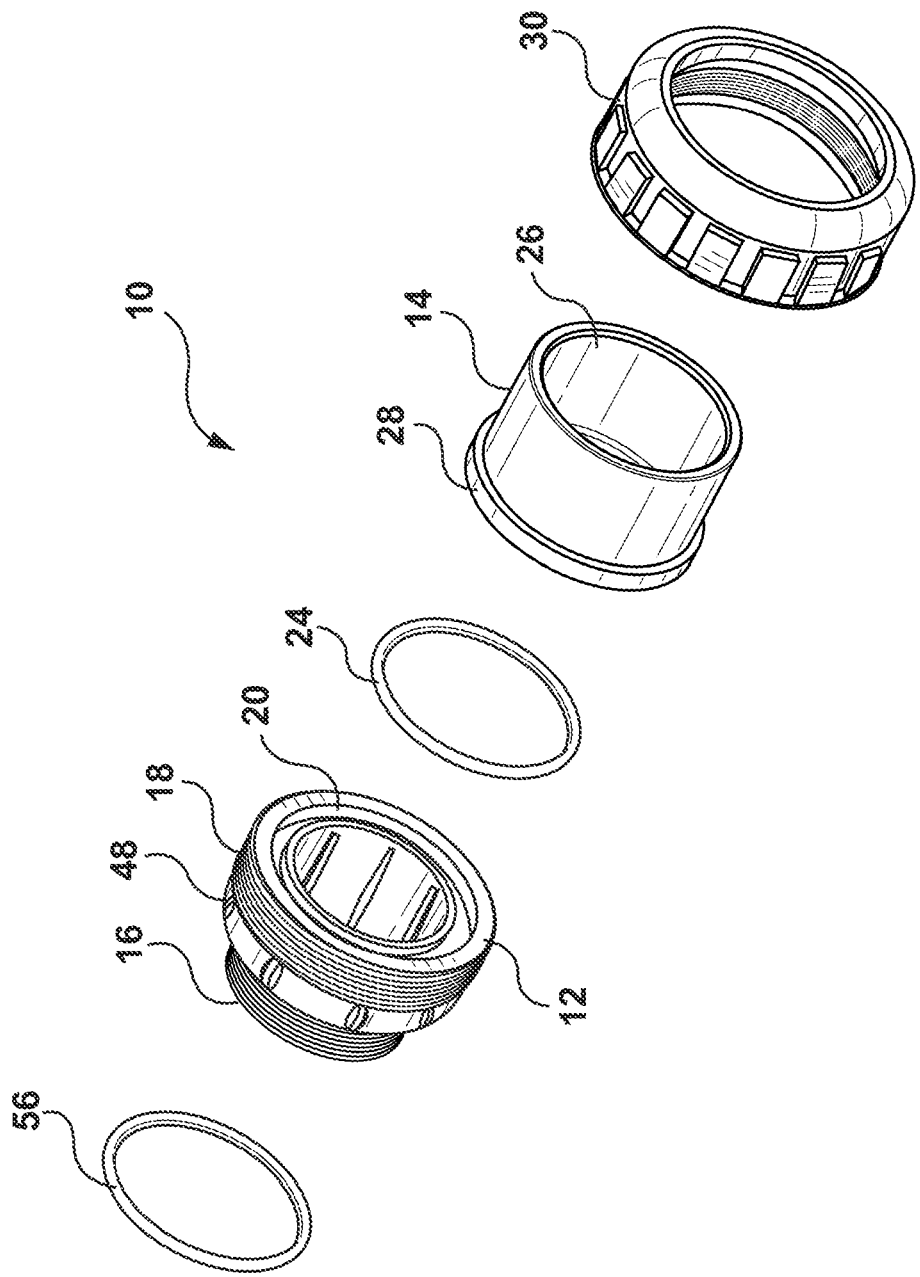

In accordance with a first aspect as shown in FIGS. 1 to 3, there is provided a coupling 10 having a first tubular member 12 and a second tubular member 14. The first tubular member 12 includes a first body portion 16 and a first flange end portion 18 extending radially outwardly from the first body portion 16. A first recess 20 extends axially into the first flange end portion 18, preferably parallel relative a longitudinal axis 22 of the first tubular member 12. Seated within the first recess 20 is a first sealing ring 24. Either or both of the first tubular member 12 and the second tubular member 14 may be formed of a material having a high temperature tolerance, such as a high temperature plastic. Such materials may be suitable for attachment to conduits for high temperature material, such as water that is boiling or near-boiling so as to prevent warping of the first tubular member 12 or the second tubular member 14.

The second tubular member 14 has a second body portion 26 and a second flange end portion 28 extending from the second body portion 26. A collar 30 is positioned about the second body portion 26. Collar 30 includes a neck portion 32 which positions the collar 30 relative to the second body portion 26. Preferably, the second body portion 26 is smoothly surfaced and the neck portion 32 is slideable along the second body portion 26 such that the collar 30 is axially displaceable along the second body portion 26. Collar 30 also includes a mouth portion 34 wider, or larger in diameter, than the neck portion 32 and extending from the neck portion 32 axially toward the second flange end portion 28. The mouth portion 34 is greater in diameter than the second flange end portion 28. When the collar 30 is positioned relative to the second body portion 26 as shown in FIG. 1, the mouth portion 34 may extend over and beyond the second flange end portion 28 whereby the neck portion 32 is in abutment with the second flange end portion 28. Accordingly, axial displacement of the collar 30 along the second body portion 26 in the direction of the second flange end portion 28 is limited by the second flange end portion 28.

Preferably, an exterior surface portion 36 of the first flange end portion 18 and an interior surface portion 38 of the mouth portion 34 are both threaded for cooperative threaded engagement therebetween. Accordingly, the mouth portion 34 is engageable with the first flange end portion 18 to draw the second flange end portion 28 into abutment with the first flange end portion 18. Abutment is achieved when first abutment surface portion 40 of first flange end portion 18 is brought into contact with second abutment surface portion 42 of the second flange end portion 28.

When the first flange end portion 18 is in abutment with the second flange end portion 28, the first sealing ring 24 is sandwiched within the first recess 20 between the first flange end portion 18 and the second flange end portion 28. More specifically, the first recess 20 includes a first recess radially inner side wall 46 and a first recess radially outer side wall 47 each extending into the first flange end portion 18 in a direction generally parallel relative to the longitudinal axis 22. The first recess radially inner side wall 46 and the first recess radially outer side wall 47 are spaced apart by a first recess base wall 44 extending in a direction perpendicular to the longitudinal axis 22 to join with each of the first recess radially inner side wall 46 and the first recess radially outer side wall 47. First sealing ring 24 is larger in diameter than the depth of the first recess 20. When the second flange end portion 28 is drawn into abutment with the first flange end portion 18, the first sealing ring 24 is compressed within the first recess 20 and a seal is formed between the first sealing ring 24 and the second abutment surface portion 42 of the second flange end portion 28.

The coupling 10 may further include a first body flange portion 48 extending radially outwardly from the first body portion 16 and axially spaced apart from the first flange end portion 18. A second recess 50 extends axially into the first body flange portion 48 generally parallel relative to the longitudinal axis 22 of the first tubular member 12 and toward the first flange end portion 18. As with the first recess 20, the second recess 50 includes a second recess radially inner side wall 54 and a second recess radially outer side wall 55 each extending into the first body flange portion 48 in a direction generally parallel relative to the longitudinal axis 22. The second recess radially inner side wall 54 and the second recess radially outer side wall 55 are spaced apart by a second recess base wall 52 extending in a direction perpendicular to the longitudinal axis 22 to join with each of the second recess radially inner side wall 54 and the second recess radially outer side wall 55. Preferably, a second sealing ring 56 is positioned within the second recess 50. Preferably, the second sealing ring 56 is identical in size and shape with the first sealing ring 24 and is interchangeable therewith.

As shown in FIG. 1, first body portion 16 may have a threaded exterior surface portion 58 which preferably extends along the first body portion 16 axially away from the first body flange portion 48. The threaded exterior surface portion 58 is preferably tapered. The taper is preferably to a lesser degree than the National Pipe Thread (NPT) Standard for tapered threads on pipes. The taper rate for NPT Standard threads is preferably 1 inch of diameter in 16 inches of length, or 62.5 millimeters per meter. A suitable taper rate for the threaded exterior surface portion would, for example, be 1 inch of diameter in any length greater than 16 inches of length. Preferably, the less than standard taper rate is at least 0.75 to 0.9 inches in diameter over a length of 16 inches. A first conduit (not shown), which is preferably a female conduit, with parallel or standard tapered threads may be coupled with the first body portion 16 by torqueing engagement and due to the less than standard tapered threads of the threaded exterior surface portion 58, there is provided a minimal interference fit between the less than standard tapered threaded exterior surface portion 58 and the parallel or standard tapered threads of the first conduit.

Preferably, the threads of the first body portion 16 are also slightly undersized in that the pitch diameter is at least 0.006 inches to 0.008 inches below the lower pitch diameter tolerance of the NPT Standard taper. "Pitch diameter" refers to the approximate halfway point between a major diameter and a minor diameter of threads of a threaded pipe or conduit. The less than standard taper of the threaded exterior surface portion 58 with the undersized or less than standard pitch diameter of the threads of the first body portion 16 permits engagement of the threaded exterior surface portion 58 along the entire length thereof or nearly the entire length thereof by the first conduit. Having full or near-full engagement between the threaded exterior surface portion 58 and the first conduit reduces mechanical stress applied to the first body portion 16 and the first conduit as compared to a first body portion having NPT standard taper threads. Standard NPT threads permit much less engagement of the threaded portions, often 70% to 80% engagement. This is important, for example, when fittings are made from materials having lower tolerances to mechanical stress, such as thermoplastics, which are fairly soft and pliable materials as compared to steel or copper fittings. Also, such full engagement or nearly full engagement serves to minimize or eliminate space between the threaded exterior surface portion 58 and the first conduit and thereby provides for full engagement of the first conduit with the second sealing ring 56 as is further described hereinafter.

When the first conduit is coupled with the first body portion 16 and the second sealing ring 56 is located within the second recess 50, the first conduit may be tightened along the tapered threaded exterior surface portion 58 until it compresses the second sealing ring 56 within the second recess 50 and forms a seal between the threaded exterior surface portion 58 and the first conduit due to the tapered thread of the threaded exterior surface portion 58. Sealing is provided between the first conduit and the tapered first body portion 16 due to the compression of the second sealing ring 56 within the second recess 50. If the second sealing ring 56 is not within the second recess 50, a seal may be formed between the first conduit and the first body portion 16 due to the slight interference fit between the less than standard tapered threaded exterior surface portion 58 and the threads of the first conduit. Preferably, suitable sealing means such as a pipe dopant or Teflon tape are also applied to the threaded exterior surface portion 58 of the first body portion 16 prior to coupling of the first conduit with the first body portion 16 to further enhance the sealing engagement therebetween.

During assembly of the coupling 10, it is possible that the first sealing ring 24 may become damaged or soiled by dirt or adhesive. This may occur, for example, as the second tubular member 14 is being removed for applying solvent liquid cement to body cavity 26 for joining pipe. In some cases, this can result in the first sealing ring 24 having to be discarded for being exposed and damaged, for example, due to excessive liquid cement squeeze out overrun from tubular member 14. Accordingly, it is advantageous to have the second sealing ring 56 that is identical in size and shape with the first sealing ring 24, since the first sealing ring 24 and the second sealing ring 56 would therefore be interchangeable. If the first sealing ring 24 has to be discarded, then the second sealing ring 56 may be removed from the second recess 50 and positioned within the first recess 20 in order to provide sealed coupling between the first tubular member 12 and the second tubular member 14. Since there is a sealing relationship between the less than standard tapered threaded exterior surface portion 58 and the first conduit with parallel or tapered threads, the relocation of the second sealing ring 56 into the first recess 20 should not result in loss of sealing between the first conduit and the first body portion 16.

The first tubular member 12 may have a bore 60 extending therethrough, as shown in FIG. 1. The bore 60 may have one or more ribs 62 extending longitudinally at least partially along the bore 60 and radially spaced apart about the bore 60. The ribs 62 may reduce turbulence in the flow of fluids through the bore 60 and thereby provide more energy efficient operation of the coupling 10. Similarly, second body portion 26 may have a smooth bore 64 extending at least partially therewithin for receiving a second conduit (not shown), which is preferably a male conduit. Second conduit may be secured within the smooth bore 64 using an adhesive or cement.

Thereby, the coupling 10 may provide a secure and sealed coupling for fluid transfer between a first conduit coupled with the first body portion 16 and a second conduit coupled with the second body portion 26.

While there have been described herein what are considered to be preferred and exemplary aspects of the present invention, other modifications of the invention shall be apparent to those skilled in the art from the teachings herein and, it is therefore desired to be secured in the appended claims all such modifications as fall within the scope of the invention.

What is claimed is:

1. A coupling comprising:
   a first tubular member having a first body portion with threads tapered at a taper rate of less than 1 inch of diameter in 16 inches of length extending at least partially along an exterior surface portion thereof;
   a first flange end portion extending radially outwardly from the first body portion;
   a first recess extending axially into the first flange end portion parallel relative a longitudinal axis of the first tubular member and toward the first body portion;
   a first sealing ring within the first recess;
   a first body flange portion extending radially outwardly from the first body portion and axially spaced apart from the first flange end portion;
   a second recess extending axially into the first body flange portion parallel relative the longitudinal axis of the first tubular member and toward the first flange end portion; and,
   a second sealing ring within the second recess;
   wherein the second sealing ring is identical in size and shape with the first sealing ring and is interchangeable with the first sealing ring.

2. The coupling of claim 1, further comprising:
   a second tubular member having a second body portion;
   a second flange end portion extending from the second body portion; and,
   a collar axially displaceable along the second body portion and engageable with the first flange end portion to draw the second flange end portion into abutment with the first flange end portion for sandwiching the first sealing ring between the first flange end portion and the second flange end portion within the first recess.

3. The coupling of claim 2, wherein the collar includes a neck portion for axial displacement along the second body portion and sized for abutment with the second flange end portion and a mouth portion wider than the neck portion and extending from the neck portion and over and beyond the second flange end portion for engagement with the first flange end portion.

4. The coupling of claim 3, wherein an exterior surface portion of the first flange end portion and an interior surface portion of the mouth portion are both threaded for cooperative threaded engagement therebetween.

5. The coupling of claim 3, wherein the second body portion is smooth at least partially along an exterior thereof and the neck portion is slidable along the second body portion.

6. The coupling of claim 2, wherein the second tubular member is formed of a material that is tolerant to boiling water temperature or near-boiling water temperature.

7. The coupling of claim 2, wherein the first flange end portion further includes a first abutment surface portion into which the first recess extends, the second flange end portion further includes a second abutment surface portion; and,
   the first sealing ring is compressed within the first recess as the first abutment surface portion and the second abutment surface portion are drawn together.

8. The coupling of claim 1, further comprising:
   a bore extending axially through the first tubular member; and,
   at least one rib extending longitudinally at least partially along the bore.

9. The coupling of claim 8, wherein the at least one rib comprises:
   a plurality of ribs radially spaced apart about the bore.

10. The coupling of claim 1, wherein the first tubular member is formed of a material that is tolerant to boiling water temperature or near-boiling water temperature.

11. The coupling of claim 1, wherein the threads of the first tubular member are tapered at a taper rate of less than 1 inch of diameter in 16 inches of length and sealingly engage with threads of a female conduit when the female conduit is torqued into engagement with the first tubular member, the threads of the female conduit being one of parallel threads and threads having a taper rate of 1 inch of diameter in 16 inches of length.

12. A tubular member comprising:
   a body portion having threads tapered at a taper rate of less than 1 inch of diameter in 16 inches of length extending at least partially along an exterior surface portion thereof;
   a flange end portion extending radially outwardly from the body portion;
   a first recess extending axially into the flange end portion parallel relative a longitudinal axis of the tubular member and toward the body portion;
   a first sealing ring within the first recess;
   a body flange portion extending radially outwardly from the body portion and axially spaced apart from the flange end portion;
   a second recess extending axially into the body flange portion parallel relative the longitudinal axis of the tubular member and toward the flange end portion; and,
   a second sealing ring within the second recess; wherein the second sealing ring is identical in size and shape with the first sealing ring and is interchangeable with the first sealing ring.

13. The tubular member of claim 12, wherein the flange end portion is for engagement with a collar extendable from a second tubular member for drawing a second tubular member into abutment with the flange end portion for sandwiching the first sealing ring between the flange end portion and the second tubular member within the first recess.

14. The tubular member of claim 13, wherein an exterior surface portion of the flange end portion is threaded for cooperative threaded engagement with the collar.

15. The tubular member of claim 13, wherein the flange end portion further includes an abutment surface portion into which the first recess extends; and, the first sealing ring is compressible within the first recess as the abutment surface portion and the second tubular member are drawn together.

16. The tubular member of claim 12, further comprising:
a bore extending axially through the tubular member; and,
at least one rib extending longitudinally at least partially along the bore.

17. The tubular member of claim 16, wherein the at least one rib comprises:
a plurality of ribs radially spaced apart about the bore.

18. The tubular member of claim 12, wherein the tubular member is formed of a material that is tolerant to boiling water temperature or near-boiling water temperature.

19. The tubular member of claim 12, wherein the threads of the first tubular member are tapered at a taper rate of less than 1 inch of diameter in 16 inches of length and sealingly engage with threads of a female conduit when the female conduit is torqued into engagement with the first tubular member, the threads of the female conduit being one of parallel threads and threads having a taper rate of 1 inch of diameter in 16 inches of length.

\* \* \* \* \*